March 23, 1943.   H. D. MATTHEWS   2,314,412
THERMOSTATIC ELEMENT
Filed March 21, 1942
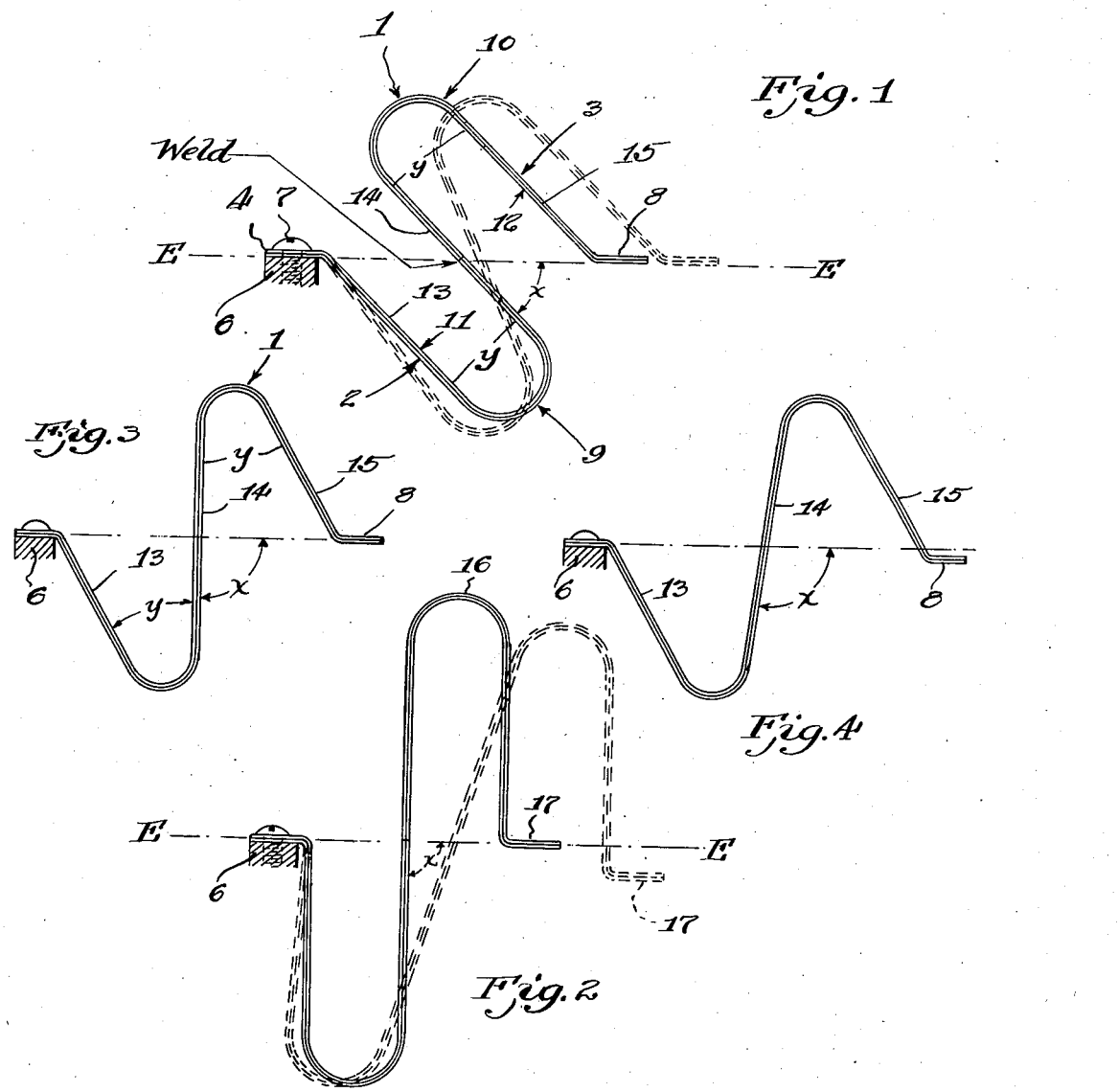
INVENTOR.
Howard D. Matthews
BY Barnes, Kisselle, Laughlin & Raisch
Attorneys.

Patented Mar. 23, 1943

2,314,412

UNITED STATES PATENT OFFICE 2,314,412

THERMOSTATIC ELEMENT

Howard D. Matthews, Detroit, Mich., assignor to W. M. Chace Company, Detroit, Mich., a corporation of Michigan Application March 21, 1942, Serial No. 435,727

14 Claims. (Cl. 297—15)

This invention relates to a thermostatic element and more particularly to a thermostatic element made of laminated metal having a straight line action.

This type of thermostatic element is not broadly new. One such thermostatic element is shown in the Gille Patent 2,196,671. It is common in the use of this type of thermostatic element to fix one end of the element to a stationary support and connect the other end of the thermostatic element to a member which is to be operated with a straight line motion by the thermostatic element upon a change in temperature. Gille shows an arrangement wherein such a thermostatic element is so used.

It is an object of this invention to produce an improved thermostatic element of the type exemplified by Gille wherein the end of the thermostatic element connected to the member to be operated moves in a straight line path with respect to the point at which the other end of the thermostatic element is fixed upon its relatively stationary support. The thermostatic element, which is the subject of this invention, requires only one reversal of the high and low expanding sides to obtain a straight line motion whereas the Gille element requires two reversals of the high and low expanding sides and therefore is more expensive to make.

It is an object of this invention to produce a thermostatic element of the above type in which appreciably more straight line movement per degree temperature rise will be obtained for an element fabricated from a thermostatic laminated metal strip of given thickness and length than has been heretofore possible. In fact comparative tests of thermostatic elements made from bimetal strips of equal thickness and length show that the thermostatic element, which is the subject of this application, has about fifty percent (50%) greater movement or activity compared to the element shown in the Gille patent.

It is also an object of this invention to produce a thermostatic element in which appreciably more movement per degree temperature rise will be obtained for an element fabricated from a thermostatic laminated metal strip of given thickness and length than has been heretofore possible.

Fig. 1 shows the thermostatic element in two positions: in the full lines the element is shown in cold position and in the dotted lines is shown in hot position.

Fig. 2 shows another form of the thermostatic element with a full line showing of the cold position of the element and a dotted line showing of the hot position of the element.

Fig. 3 shows the same thermostatic element as Fig. 1 wherein upon a rise in temperature the element has reached the limit of straight line movement.

Fig. 4 shows the same thermostatic element as Fig. 1 wherein the element has been heated beyond the temperature at which it travels in a straight line.

Referring more particularly to the drawing there is shown a thermostatic element generally designated 1 of laminated metal. The laminated metal from which the element 1 is made can have any desired number of laminations, but for purposes of description the element 1 is shown as made from thermostatic bimetal.

The element 1 is symmetrical about line E—E and consists of two identical sections of bimetal of U shape which are welded together end for end along the line indicated by the arrow bearing the legend "weld." The bimetal sections can be made from any of the well-known thermostatic bimetal materials on the market fabricated in any of numerous well-known and conventional ways. The two sections will be designated 2 and 3 respectively. Each section consists of a flat strip of thermostatic bimetal bent into the form shown.

Section 2 has a flat end portion 4 which is secured to a stationary support 6 by any suitable means, such as the screw 7. Section 3 has a corresponding flat end portion 8 which is adapted for connection to whatever member it is desired to have the element 1 operate. End 4 may be termed the support end and end 8 the operative end of the element 1. End portions 4 and 8 are in alignment and in the same plane within the temperature range for which the element 1 is designed to operate. The straight line E—E which lies in the plane of end portions 4 and 8 indicates the straight line along which end 8 travels during the expansion and contraction of the element 1 incident to a rise and fall in temperature.

Each of the sections 2 and 3 consists of a lamina or side having a high coefficient of expansion and a lamina or side having a relatively low coefficient of expansion. Any of the desirable well-known metal alloys can be used for the high and low expansion sides of the sections 2 and 3. As specified above, elements 2 and 3 are substantially identical. The high expanding lamina or side in each of the sections 2 and 3 can be either on the inside or the outside of the section, in which case the low expanding side or lamina will, of course, be on the opposite side of the section. For purposes of description, sections 2 and 3 are herein shown with the low expansion lamina on the outside. The low expansion lamina in section 2 is designated 9 and in section 3 is designated 10. The high expansion lamina for purposes of description is shown on the inside of sections 2 and 3. The high expanding lamina of section 2 is designated 11 and the high expanding lamina of section 3 is designated 12.

As is well known, thermostatic elements are usually made to operate within predetermined temperature ranges. At the lower end of the temperature range the thermostat is commonly referred to as in "cold" position and at the upper end of the temperature range the thermostat is usually referred to as in the "hot" position. By way of illustration in Fig. 1, the element 1 is shown in the full lines in cold or room temperature position. At this time the straight elongated portions or legs 13, 14 and 15 of the element are substantially parallel and the angle X between the center leg or straight portion 14 and the straight line E—E is an acute angle.

In order to obtain the greatly improved and increased straight line movement over the prior art thermostatic elements, it is essential that the angle X in both the hot and cold positions of the element should never be greater than 90°. The reason for this is illustrated in Fig. 2 wherein the thermostatic element, generally designated 16, is fabricated the same as element 1 except that the angle X is 90°. In the hot position, shown in the dotted lines, it will be noted that the end 17 of the element 16 has fallen below the line E—E in traveling from cold to hot position. This movement at right angles to the line E—E is achieved at the expense of the movement along the line E—E. Therefore, at temperatures higher than the temperature at which element 16 is in the cold position, element 16 is inefficient for straight line movement. However, end 17 in moving from the full line to the dotted line position will travel a greater distance and give a greater movement than is possible with the construction of the Gille patent where the element is fabricated from a thermostatic laminated metal strip of given thickness and length. Thus, it should be understood that element 16, shown in Fig. 2, is a very useful element but, of course, is not preferred where a straight line movement of the operative end of the element is desired.

When the element 1, shown in Fig. 1, is subjected to a sufficient rise in temperature, the angle X becomes greater until it finally equals a right angle, as shown in Fig. 3, and legs 13 and 15 move out of parallelism with leg 14 but the included angle Y between legs 13 and 14 and 14 and 15 is an acute angle. In the initial or cold position of the element, Fig. 1, since the legs 13, 14 and 15 are parallel, the angle Y is equal to 0°. Upon a still further rise in temperature the angle X becomes greater than 90°. As soon as the angle X exceeds 90°, end 8 ceases to travel along the line E—E, but continues its travel toward the right and downwardly, as shown in Fig. 4.

If one desires an element having a straight line action and operating within a range of temperatures above room temperature, then one initially makes the element 1 so that at room temperature or the lowest temperature at which it is designed to operate, it will have the form shown in the full lines of Fig. 1, with the low expanding laminae 9 and 10 on the outside of the sections 2 and 3. If one desires an element having a straight line action which expands or operates the control with which it is connected upon a fall in temperature, then one would make an element such as shown in Fig. 1, but with the high and low expanding laminations reversed, that is, the high expanding lamination would be positioned on the outside of sections 2 and 3 and the low expanding laminations would be positioned on the inside of the sections 2 and 3. In other words, one would substitute high expanding laminations for laminations 9 and 10 and low expanding laminations for laminations 11 and 12 in the element shown in Fig. 1. With the element thus fabricated, upon a fall in temperature, the element would expand exactly as shown in Figs. 1, 3 and 4 upon a fall in temperature and would accurately reverse this line of travel upon a rise in temperature.

If one desires to fabricate a thermostatic element having a straight line action, with an operating temperature range less than room temperature and with the low expanding laminations on the outside of the U sections 2 and 3, then one initially can form the element in the shape shown in Fig. 3 with the angle X 90° and the angle Y will have the same value as the angle Y of element 1 in Fig. 3. The value for angle Y in Fig. 3 is arrived at empirically by heating the element 1 of Fig. 1 until angle X equals 90° and angle Y can then be measured. Such an element will contract or operate with a straight line action upon a fall of temperature until the angle Y equals 0°, as in Fig. 1, and angle X about 30°. Upon a rise in temperature such an element will expand with a straight line action exactly the reverse of its contracting line of action.

If one initially fabricated an element in the form shown in the dotted lines Fig. 1, with the low expanding laminations on the outside of the U sections and the high expanding laminations on the inside of the U sections, then upon a temperature fall this element too would contract with a straight line action until it reached the shape shown in the full lines of Fig. 1 and reverse this exact movement upon a rise in temperature.

The element 1, such as shown in Figs. 1, 3 and 4, might very well be useful in a device where it was desired to have straight line action for a portion of the travel of the element, as shown in Figs. 1 and 3, and not a straight line motion, i. e., motion to the right and downwardly as illustrated in Fig. 4, for the remaining portion of the travel. It is, of course, understood that with all of the elements above described, each will have the same expansion and contraction curve within its operating temperature range. It has been found empirically that to obtain the straight line movement of the operating end 8 of the element that the angle X should not be less than about 30° nor greater than 90° and with angle X equal to about 30°, angle Y should be about 0°, i. e., legs 13, 14 and 15 about parallel.

I claim:

1. A laminated thermostatic element arranged to have a straight line action throughout a predetermined range of temperatures comprised of at least two substantially U shaped sections curved in opposite directions and joined together so as to be symmetrical with respect to a straight line, the outer legs of said sections being of equal length and the adjoining legs of said sections being of equal length but shorter than the outer legs, the said sections having their outer laminae comprised of similar metal, each section being positioned at an angle of 90° or less with respect to said line of symmetry whereby upon a change in temperature the ends of said element will travel in a straight line one relative to the other.

2. The thermostatic element as defined in claim 1 having two flat end portions positioned in substantially the same plane and traveling in the same plane one relative to the other upon a change in temperature.

3. A laminated thermostatic element adapted to operate with a straight line relationship between its supporting and free end within a predetermined temperature range comprising at least two substantially U shaped sections curved in opposite directions and offset one from the other and joined together so as to be symmetrical with respect to a straight line, the outer legs of said sections being of equal length and the adjoining legs of said sections being of equal length but shorter than the outer legs, the said sections having their outer laminae comprised of metal having similar coefficients of expansion, each section being positioned at an angle of 90° or less with respect to said line of symmetry within the temperature range of the element whereby upon a change in temperature the ends of said element will travel along the line of symmetry one relative to the other.

4. A laminated thermostatic element adapted to operate with a straight line relationship between its supporting and free end within a predetermined temperature range comprising at least two substantially U shaped sections curved in opposite directions and offset one from the other and joined together so as to be symmetrical with respect to a straight line, the outer legs of said sections being of equal length and the adjoining legs of said sections being of equal length but shorter than the outer legs, the said sections having their outer laminae comprised of similar metal having a low coefficient of expansion relative to the inner laminae of said sections, each section being positioned at an angle of 90° or less with respect to said line of symmetry within the temperature range of the element whereby upon a change in temperature the ends of said element will travel along the line of symmetry one relative to the other.

5. A laminated thermostatic element adapted to operate with a straight line relationship between its supporting and free end within a predetermined temperature range comprising at least two substantially U shaped sections curved in opposite directions and offset one from the other and joined together so as to be symmetrical with respect to a straight line, the outer legs of said sections being of equal length and the adjoining legs of said sections being of equal length but shorter than the outer legs, the said sections having their outer laminae comprised of metal having similar coefficient of expansion, each section being positioned at an acute angle with respect to said line of symmetry within the temperature range of the element whereby upon a change in temperature the ends of said element will travel along the line of symmetry one relative to the other.

6. A laminated thermostatic element arranged to have a straight line action throughout a predetermined range of temperatures consisting of two substantially U shaped sections curved in opposite directions, the outer legs of said sections being of equal length and the adjoining legs of said sections being of equal length but shorter than the outer legs, the end of the shorter leg of one of the U sections being aligned with and joined to the end of the shorter leg of the other section so that the two remaining longer legs of the said sections are on opposite sides of the two aligned and joined legs of the sections, the said sections having their outer laminae comprised of metal having a different coefficient of expansion than the metal from which the inner lamina is comprised.

7. The thermostatic metal element defined in claim 6 and having outwardly turned coplanar end portions within the operating range of the said device.

8. A laminated thermostatic element arranged to have a straight line action throughout a predetermined range of temperatures consisting of two substantially U shaped sections curved in opposite directions and symmetrical with respect to a straight line passing through the outer ends of the U sections whereby the element includes two outer leg portions and a middle leg portion, the said outer leg portions being substantially parallel to the middle leg portion and the middle leg portion makes an acute angle of about 30° with the said line of symmetry at one extreme of said temperature range, the said sections having their outer laminae comprised of similar metal having one coefficient of expansion and their inner laminae comprised of similar metal having a different coefficient of expansion whereby as the element expands due to a temperature change within said range the ends of said element will travel in a straight line one relative to the other until at the other extreme of said temperature range the said acute angle between the middle leg and the line of symmetry approximates 90°.

9. A laminated thermostatic element arranged to have a straight line action throughout a predetermined range of temperatures consisting of two substantially U shaped sections curved in opposite directions and symmetrical with respect to a straight line passing through the outer ends of the U sections whereby the element includes two outer leg portions and a middle leg portion, the said outer leg portions being substantially parallel to the middle leg portion and the middle leg portion makes an acute angle of about 30° with the said line of symmetry at one extreme of said temperature range, the said sections having their outer laminae comprised of similar metal having a low coefficient of expansion and their inner laminae comprised of a metal having a relatively high coefficient of expansion whereby as the element expands upon a rise in temperature within said range the ends of said element will travel in a straight line one relative to the other until at the other extreme of said temperature range the angle between the middle leg and the line of symmetry approximates 90°.

10. A laminated thermostatic element arranged to have a straight line action throughout a predetermined range of temperatures consisting of two substantially U shaped sections curved in opposite directions and symmetrical with respect to a straight line passing through the outer ends of the U sections whereby the element includes two outer leg portions and a middle leg portion, the said outer leg portions being substantially parallel to the middle leg portion and the middle leg portion makes an acute angle of about 30° with the said line of symmetry at one extreme of said temperature range, the said sections having their outer laminae comprised of similar metal having a high coefficient of expansion and their inner laminae comprised of similar metal having a relatively low coefficient of expansion whereby as the element expands upon a fall in temperature within said range the ends of said element will travel in a straight line one relative to the other until at the other extreme of said temperature range the angle between the middle leg and the line of symmetry approximates 90°.

11. A laminated thermostatic element arranged to have a straight line action throughout a predetermined range of temperatures comprised of at least two substantially U shaped sections curved in opposite directions, each U section having a leg aligned with a leg of the other section and joined together to form an S shaped element symmetrical with respect to a straight line running through the outer ends of the element, the said sections having their outer laminae comprised of a similar metal, the said sections having their inner laminae comprised of a like metal and having a different coefficient of expansion than the metal from which the outer laminae are comprised, the said legs of the element all being substantially parallel and the angle between the line of symmetry and the middle leg portions is approximately 30° at one extreme of said temperature range and the said outer leg portions forming acute angles with the adjoining inner leg portions at a different operating temperature of the element when the angle between the line of symmetry and the inner leg portion of the element is greater than about 30° and less than about 90°.

12. A thermostatic element arranged to have a straight line action throughout a predetermined range of temperatures comprising an S shaped strip of laminated thermostatic metal, said S shaped element consisting of two substantially identical elements joined together at approximately the middle of the S shaped element, the outer legs of said elements being of equal length and the adjoining legs of said elements being of equal length but shorter than the outer legs, the said sections having their outer laminae comprised of metal having similar coefficients of expansion and their inner laminae comprised of metal also having similar coefficients of expansion but different than the coefficients of expansion of the outer laminae.

13. A thermostatic element adapted to operate with a straight line relationship between its supporting end and its free end within a predetermined temperature range comprising an S shaped strip of laminated thermostatic metal, said S shaped element consisting of two substantially identical elements joined together at approximately the middle of the S shaped element, the said sections having their outer laminae comprised of metal having similar coefficients of expansion and their inner laminae comprised of metal also having similar coefficients of expansion but different than the coefficients of expansion of the outer laminae, the outer legs of said elements being of equal length and the adjoining legs of said elements being of equal length but shorter than the outer legs, the said S shaped strip at one end of its operating temperature range having its three legs substantially parallel and at the other end of its operating temperature range each of the outer legs making an acute included angle with the center leg.

14. A laminated thermostatic element arranged to have a straight line action throughout a predetermined range of temperatures consisting of two substantially U shaped sections curved in opposite directions, the outer legs of said U sections being of equal length and the adjoining legs of said elements being of equal length but shorter than the said outer legs, the said U sections having the ends of their shorter legs joined together so as to be symmetrical with respect to a straight line passing through the outer ends of the U sections whereby the element includes two outer leg portions and a middle leg portion consisting of the two joined shorter legs of the U shaped sections, the said outer leg portions being substantially parallel to the middle leg portion and the middle leg portion makes an acute angle with the said line of symmetry at one extreme of said temperature range, the said sections having their outer laminae comprised of similar metal having one coefficient of expansion and their inner laminae comprised of similar metal having a different coefficient of expansion whereby as the element expands due to a temperature change within said range the ends of said element will travel in a straight line one relative to the other until at the other extreme of said temperature range the said acute angle between the middle leg and the line of symmetry approximates 90°.

HOWARD D. MATTHEWS.